(12) United States Patent
Pourzandi et al.

(10) Patent No.: US 9,882,874 B2
(45) Date of Patent: Jan. 30, 2018

(54) METHOD AND APPARATUS FOR VIRTUAL FIREWALL MIGRATION IN A WIRELESS COMMUNICATION NETWORK

(71) Applicant: Telefonaktiebolaget L M Ericsson (publ), Stockholm (SE)

(72) Inventors: Makan Pourzandi, Montreal (CA); Zhongwen Zhu, Saint-Laurent (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 673 days.

(21) Appl. No.: 13/974,637

(22) Filed: Aug. 23, 2013

(65) Prior Publication Data

US 2015/0058966 A1   Feb. 26, 2015

(51) Int. Cl.
| | |
|---|---|
| *H04L 29/06* | (2006.01) |
| *H04W 12/08* | (2009.01) |
| *G06F 9/455* | (2006.01) |
| *H04W 36/00* | (2009.01) |

(52) U.S. Cl.
CPC .......... *H04L 63/02* (2013.01); *H04L 63/0227* (2013.01); *H04W 12/08* (2013.01); *G06F 9/45558* (2013.01); *H04W 36/0038* (2013.01)

(58) Field of Classification Search
CPC ... G06F 15/177; G06F 9/45558; H04L 63/02; H04W 8/02
USPC .......................................................... 726/11
See application file for complete search history.

(56) References Cited

U.S. PATENT DOCUMENTS

| | | | |
|---|---|---|---|
| 8,146,147 B2 | 3/2012 | Litvin et al. | |
| 2007/0204266 A1* | 8/2007 | Beaty ................. | G06F 9/45558 718/1 |
| 2008/0229088 A1* | 9/2008 | Barth et al. .................... | 713/1 |
| 2009/0249438 A1 | 10/2009 | Litvin et al. | |
| 2012/0173757 A1* | 7/2012 | Sanden ............... | G06F 9/45558 709/238 |
| 2012/0188983 A1* | 7/2012 | Mihaly et al. ................ | 370/331 |

(Continued)

FOREIGN PATENT DOCUMENTS

WO    2012132808 A1    10/2012

OTHER PUBLICATIONS

Satyanarayanan, M. et al. "The Case for VM-based Cloudlets in Mobile Computing." IEEE Pervasive Computing, Nov. 2009, pp. 1-9.

(Continued)

*Primary Examiner* — Hadi Armouche
*Assistant Examiner* — Bryan Wright
(74) *Attorney, Agent, or Firm* — Murphy, Bilak & Homiller, PLLC

(57) ABSTRACT

This disclosure provides example details for apparatuses and methods that manage virtual firewalls in a wireless communication network that includes a Core Network, CN, and an associated Radio Access Network, RAN. The virtual firewalls process traffic for respective wireless devices supported by the network. For example, the virtual firewall associated with a given wireless device is maintained in the RAN at the RAN node supporting the device, and is migrated from that RAN node in response to detecting a handover event involving the device. Advantageously, migration may be "horizontal," where the associated virtual firewall is moved between nodes in the RAN, or may be "vertical," where the associated virtual firewall is moved from the RAN to the CN.

18 Claims, 8 Drawing Sheets

(56) References Cited

U.S. PATENT DOCUMENTS

| | | | |
|---|---|---|---|
| 2013/0019277 A1 | 1/2013 | Chang et al. | |
| 2013/0136032 A1* | 5/2013 | Meirosu | H04W 8/02 370/254 |
| 2013/0303114 A1* | 11/2013 | Ahmad | H04W 16/14 455/406 |

OTHER PUBLICATIONS

Loke, S.W. "Supporting Ubiquitous Sensor-Cloudlets and Context-Cloudlets: Programming Compositions of Context-Aware Systems for Mobile Users." Future Generation Computer Systems, vol. 28, pp. 619-632, 2012.

* cited by examiner

(12) United States Patent
US 9,882,874 B2

METHOD AND APPARATUS FOR VIRTUAL FIREWALL MIGRATION IN A WIRELESS COMMUNICATION NETWORK

TECHNICAL FIELD

The present invention generally relates to wireless communication networks and particularly relates to virtual firewalling in such networks.

BACKGROUND

Wireless devices provide always-on connectivity to their users and the broad availability of business. Consumer and lifestyle applications make such devices an integral part of daily life, from conducting banking transactions, booking restaurant reservations, web browsing, and general electronic content consumption. Unfortunately, their prevalence and range of uses make wireless devices an increasingly attractive target for various electronic hacks, including computer viruses, malware, etc. Consequently, it is becoming increasingly common to implement some form of firewall on wireless devices.

Here, the term "firewall" has an ordinarily understood meaning in the computer arts and broadly refers to a network security mechanism implemented in hardware and/or software and configured to detect suspicious or unauthorized activity based on analyzing the network traffic passing through the firewall. Simple firewalls operate in stateless manner and evaluate individual packets of traffic without regard to their respective packet flows or connections. More sophisticated firewalls are referred to as "stateful" firewalls and this type of firewall analyzes network traffic based on detecting new connections and accumulating packet information for individual connections. Firewalls also may operate at the application level, where knowledge of application behaviors and protocols is exploited to detect suspicious or unauthorized activity.

In the context of a given wireless device, its firewall establishes a secure boundary between the device and other devices or systems, based on analyzing the traffic going between the device and the supporting wireless communication network. Here, it will be appreciated that this traffic generally is pass-through traffic with respect to the wireless communication network, with the firewalled device as one endpoint and some device or system in an external network as the other endpoint.

While some types of wireless devices may have ample computing resources to support local implementation of such firewalls, such resources are quite limited in other types of wireless devices. The resource constraints become more acute as the firewall sophistication increases. For example, a sophisticated stateful firewall may consume significantly more memory and compute cycles than a firewall that uses simple, stateless packet filtering.

SUMMARY

This disclosure provides example details for apparatuses and methods that manage virtual firewalls in a wireless communication network that includes a Core Network, CN, and an associated Radio Access Network, RAN. The virtual firewalls process traffic for respective wireless devices supported by the network. For example, the virtual firewall associated with a given wireless device is maintained in the RAN at the RAN node supporting the device, and is migrated from that RAN node in response to detecting a handover event involving the device. Advantageously, migration may be "horizontal," where the associated virtual firewall is moved between nodes in the RAN, or may be "vertical," where the associated virtual firewall is moved from the RAN to the CN.

In one example, a first control node is configured for operation in a wireless communication network and is more particularly configured to perform a method of virtual firewall management. The method according to one embodiment includes detecting a handover event involving handover of a wireless device from a first RAN node in the network to a second RAN node in the network, wherein an associated virtual firewall is maintained for the wireless device at the first RAN node. Further, responsive to detecting the handover event, the method includes initiating a migration of the associated virtual firewall from the first RAN node. The migration being a horizontal migration of the associated virtual firewall to the second RAN node, or being a vertical migration of the associated virtual firewall into the CN.

The first control node includes a communication interface for communicating with the first RAN node, and includes a processing circuit that is operatively associated with the communication interface and configured to implement the above method, or variations of it. The processing circuit comprises, for example, fixed processing circuits, programmed processing circuits, or some combination thereof, and, according to at least one embodiment, the first control node is a Serving Gateway or other packet router that provides an interface for carrying user traffic between the RAN nodes and the CN.

In another aspect, a method of virtual firewall management is performed at a first RAN node and includes maintaining an associated virtual firewall for a wireless device served by the first RAN node, and receiving transfer initiation signaling from a control node in the network, indicating that the associated virtual firewall is to be migrated. The method further includes transferring the associated virtual firewall in accordance with the transfer initiation signaling, where the migration is either horizontal or vertical.

The first RAN node comprises a communication interface and an associated processing circuit that is configured to perform the above method, or variations of it. The processing circuit comprises fixed or programmed circuitry, or some combination thereof.

In a corresponding example, a method of virtual firewall management is performed at a second RAN node, and includes receiving an associated virtual firewall for a wireless device, from the first RAN node, or from an associated control node in the CN, and activating the associated virtual firewall at the second RAN node, for processing traffic for the wireless device according to the associated virtual firewall. The method further includes sending an indication of said activation to the first RAN node, or to the associated control node. As with the first RAN node, the second RAN node comprises a communication interface and an associated processing circuit that is configured to perform the method, or variations of it.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
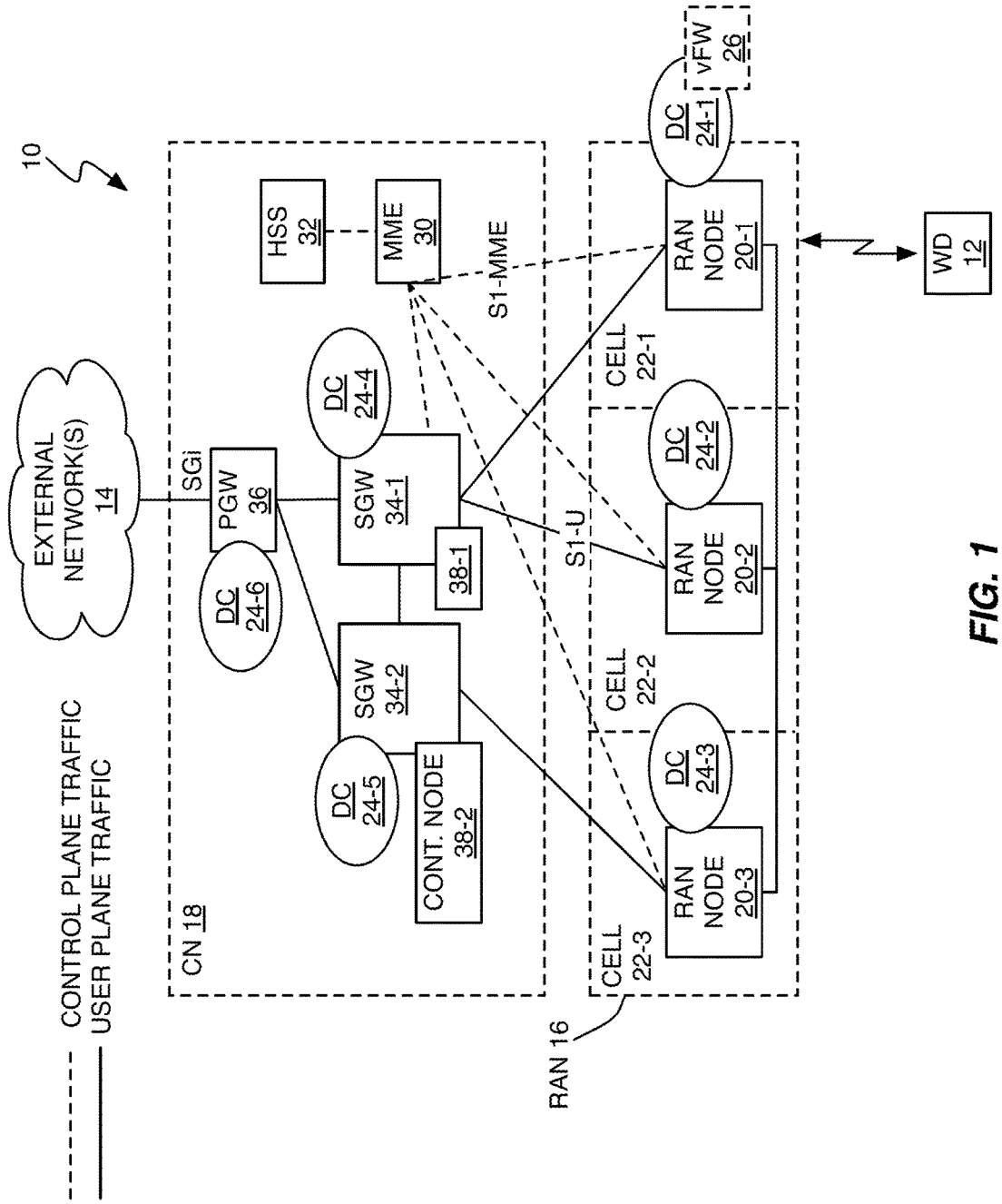
FIG. 1 is a block diagram of one embodiment of a wireless communication network that includes one or more nodes configured according to the virtual firewall management teachings herein.

FIG. 1 illustrates a wireless communication network 10 according to an example embodiment. The network 10 provides communication services for any number of wireless devices 12, based on communicatively coupling them to one or more external networks 14, such as the Internet or other packet data networks. Only one such device 12 is shown for ease of discussion.

The depicted network 10 includes a Radio Access Network or RAN 16, and a Core Network or CN 18. The RAN 16 includes a number of RAN nodes 20 that provide the air interface connecting the devices 12 to the network 10. Each RAN node 20 provides wireless service within one or more cells 22 and the diagram illustrates a RAN node 20-1 providing service in a corresponding cell 22-1, a RAN node 20-2 providing service in a corresponding cell 22-2, and a RAN node 20-3 providing service in a corresponding cell 22-3. The cells 22 may be the same size or different sizes and may wholly or partially overlap one another, and any given RAN node 20 may use different air interface resources to serve more than one cell 22.

In one example, the RAN 16 is arranged as a homogeneous network having macro-coverage RAN nodes 20 providing a macro-coverage layer. In another embodiment, the RAN 16 is arranged as a heterogeneous network having a mix of macro-coverage and micro-coverage RAN nodes 20, e.g., where the micro-coverage RAN nodes 20 provide hotspot coverage areas within the cells 22, or are otherwise used to fill in coverage gaps, extend coverage areas, etc.

In any case, one sees that each RAN node 20 includes or is associated with a data center 24, which data centers 24 are denoted in the diagram as "DC 24-1," "DC-24-2," and "DC 24-3." As a non-limiting example, each data center 24 may be understood as a "cloudlet," meaning that each one serves a small computing cloud for its respective RAN node 20 and the devices 12 supported by RAN node 20. Thus, by way of non-limiting example, each data center 24 comprises a computer system, such as a server computer having a central processor and memory and executing a computer program that provides one or more functions used to support or enhance the communication services provided to the devices 12.

For purposes of this disclosure, the data centers 24 implement virtual firewalls 26 for individual devices 12 served by the respective RAN node 20. The term "virtual" as used here denotes the fact that the firewall for a given device 12 is not physically implemented on the device itself but rather is realized in the processing resources of the data center 24. In a more detailed example, a "virtual firewall" can be understood as a firewall service running entirely within a virtualized environment, but which can provide the same packet filtering and monitoring as is conventionally provided by a physical network firewall or firewall service appliance.

Advantageously, according to the teachings herein, the network 10 "manages" these virtual firewalls as a function of device mobility. Such management includes migrating the virtual firewall 26 for a given device 12 from one RAN node 20 to another RAN node 20, e.g., such in a handover of the device 12 between the RAN nodes 20, or migrating the virtual firewall 26 for a given device 12 from the RAN 16 into the CN 18. In some embodiments, the virtual firewalls 26 are "stateful" and in such embodiments the migration of the associated virtual firewall 26 for a given device 12 means that the state information is included in the migration.

To support the vertical migration example, the CN 18 may include one or more data centers 24—shown by way of example as data centers 24-4, 24-5 and 24-6 in FIG. 1. In more detail, the CN 18 includes one or more entities that perform overall mobility management for devices 12 moving within the network 10, shown as a Mobility Management Entity or MME 30. The CN 18 further includes an entity that maintains subscriber information, e.g., for authentication, billing, etc., shown as a Home Subscriber Server or HSS 32. Further, the CN 18 includes one or more entities that provide the interface for carrying user traffic—i.e., traffic for individual ones of the devices 12—between the CN 18 and the RAN 16, shown here as Serving Gateways or SGWs 34. In turn, each SGW 34 couples to an overall Packet Gateway or PGW 36, which provides a packet interface—"SGi" in the diagram—towards the external networks 14.

The skilled person will recognize that certain architectural and notational details from FIG. 1 are consistent with networks based on the standardization work by the Third Generation Partnership Project, 3GPP, for Long Term Evolution, LTE, and LTE-Advanced networks. In particular, the RAN 16 is illustrated as an Evolved Universal Terrestrial Radio Access Network or E-UTRAN, and the CN 18 is illustrated as an Evolved Packet Core or EPC.

In an E-UTRAN embodiment of the RAN 16, the RAN nodes 20 generally are eNodeBs. One may refer to the document 3GPP TS23.002 for an overview of 3GPP network elements, as used in the EPC and in older, legacy CNs. For EPC details in the context of E-UTRAN access, one may refer to 3GPP TS 23.401. Of course, FIG. 1 is merely an example and the teachings herein are not limited to LTE and LTE-Advanced networks, and are applicable to other types of networks, such as GSM and W-CDMA networks.

Indeed, in a general sense, it is contemplated to implement one or more control nodes 38 in the network 10, e.g., in the CN 18, to provide at least some of the virtual firewall management operations contemplated herein. In the LTE context of FIG. 1, the contemplated control nodes 38 are implemented in or co-located with the SGWs 34—e.g., a control node 38-1 is associated with the SGW 34-1 and a control node 38-2 is associated with the SGW 34-2. In at least one embodiment, the control node 38 at a given SGW 34 can be understood as being wholly integrated with the SGW 34, so that the virtual firewall management can be understood as an extension of the conventional packet routing and management functionality of the SGW 34. In general, the control node(s) 38 are integrated, co-located, or otherwise adapted as needed to accommodate the architectural and functional details of the network type in which they are implemented.

Figure 2:
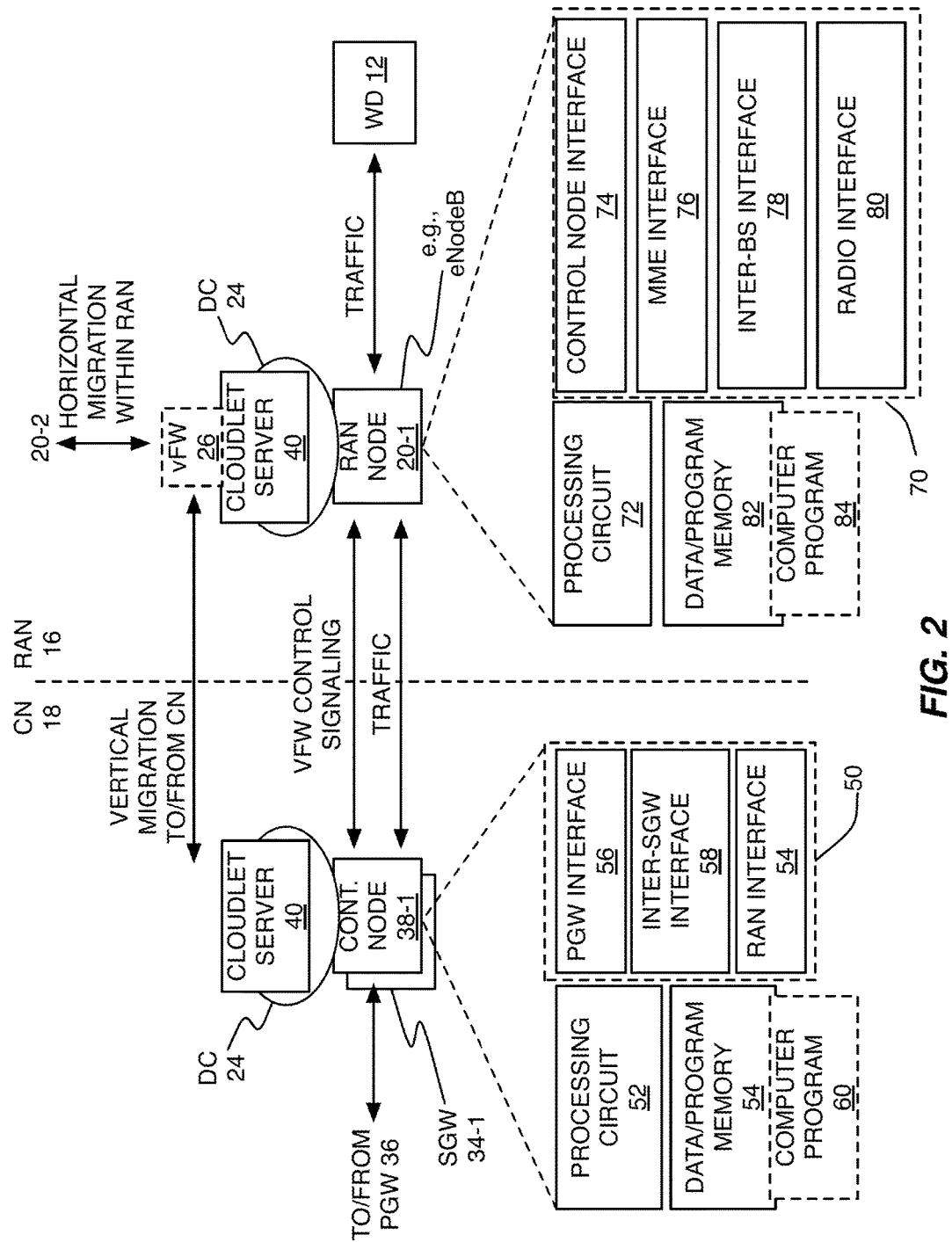
FIG. 2 is a block diagram illustrating example embodiments of a Serving Gateway as an example Core Network (CN) control node and an eNodeB as an example RAN node.

FIG. 2 illustrates example embodiments for a first control node 38-1 and a first RAN node 20-1. The data center 24 associated with the first control node 38-1 includes a cloudlet server 40 that is configured to manage and apply virtual firewalls to user traffic for given devices 12, e.g., under control of the first control node 38-1. Similarly, the data center 24 associated with the first RAN node 20-1 includes a cloudlet server 40 that is configured to manage and apply virtual firewalls to user traffic for given wireless devices 12.

The first control node 38-1 is configured for virtual firewall management within the network 10 and comprises a communication interface configured 50 for communicating with a first RAN node 20-1 and further comprises a processing circuit 52 that is operatively associated with the communication interface 50.

The processing circuit 52 is configured to detect a handover event involving handover of a device 12 from the first RAN node 20-1 to a second RAN node 20-2, where an associated virtual firewall 26 is maintained for the device 12 at the first RAN node 20-1. Correspondingly, the processing circuit 52 is further configured to initiate a migration of the associated virtual firewall 26 from the first RAN node 20-1, the migration being a horizontal migration of the associated virtual firewall 26 to the second RAN node 20-2, or being a vertical migration of the associated virtual firewall 26 into the CN 18.

In an example configuration, the processing circuit 52 is configured to select between horizontal migration or vertical migration of the associated virtual firewall 26 based on evaluating at least one of: mobility data for the device 12, and location data for the device 12. Here, "mobility data" broadly encompasses any one or more parameters, indicators, or values. For example, the mobility data may comprise a handover indication or report, or a request for handover, or the underlying measurement reports used to trigger handover. The mobility data also may comprise speed and/or trajectory information for the device 12, handover statistics for the device 12, etc.

In at least one embodiment, the processing circuit 52 is configured to perform at least one of the following operations: select vertical migration of the associated virtual firewall 26, if the mobility data indicates a rate or frequency of handover for the device 12 that is above a defined threshold, or indicates a speed of the device 12 that is above a defined threshold; and select vertical migration of the associated virtual firewall 26 if the location data corresponds to a service area where the network 10 is configured to select vertical migration.

If vertical migration of the associated virtual firewall 26 was selected rather than horizontal migration, the processing circuit 52 in one or more embodiments is configured to later determine whether to migrate the associated virtual firewall 26 back into the RAN 16. For example, it may make that later decision based on evaluating at least one of: subsequent mobility data for the device 12, and subsequent location data for the device 12. Such operation represents an attempt to balance between placement of the virtual firewall 26 as close to the network edge as possible—i.e., at the RAN node level—versus the desire to avoid the inefficiencies or impracticalities of rapidly and repeatedly moving the virtual firewall 26 from one RAN node 20 to the next.

In some embodiments, the first control node 38-1 is a first SGW 34-1 in the CN 18, and is configured for transferring traffic to and from at least those devices 12 served by the first RAN node 20-1. For a case where the first and second RAN nodes 20-1 and 20-2 are both associated with the first SGW 34-1, the processing circuit 52 in an example configuration initiates horizontal migration of the associated virtual firewall 26 by sending control signaling towards the first RAN node 20-1, indicating that the associated virtual firewall 26 is to be transferred to the second RAN node 20-2. In such instances, the processing circuit 52 may also be configured to temporarily tunnel post-handover traffic involving the device 12 through the first SGW 34-1 and the first RAN node 20-1, for processing of the post-handover traffic via a copy of the associated virtual firewall 26, as retained at the first SGW 34-1 or at the first RAN node 20-1, until detecting that the associated virtual firewall 26 has been activated for the device 12 at the second RAN node 20-2.

Conversely, if the first RAN node 20-1 is associated with the first SGW 34-1 and the second RAN node 20-2 is associated with a second SGW 34-2 operating as a second control node 38-2 in the network 10, the processing circuit 52 may be configured to initiate horizontal migration by sending control signaling towards the first RAN node 20-1, indicating that the associated virtual firewall 26 is to be transferred to the first SGW 34-1, and to then transfer the associated virtual firewall 26 from the first SGW 34-1 to the second SGW 34-2. In such cases, the processing circuit 52 also may be configured to temporarily tunnel post-handover traffic involving the device 12 through the first SGW 34-1 and the first RAN node 20-1, for processing of the post-handover traffic via a copy of the associated virtual firewall 26 as retained at the first SGW 34-1 or at the first RAN node 20-1, until detecting that the associated virtual firewall 26 has been activated for the device 12 at the second RAN node 20-2.

Although it should be understood that the implementation details can be varied without departing from the firewall management operations taught herein, in an example case the control node 38-1 is the first SGW 34-1, or at least is functionally integrated within the first SGW 34-1. Thus, the communication interface 50 may comprise a number of communication interfaces, some of which may share certain physical connections, but which may use different protocols. For example, the communication interface 50 includes a RAN interface 54, a PGW interface 56, and an inter-SGW interface 58, for communicating with other control nodes 38 SGWs 34. The RAN interface 54 may comprise different interfaces or protocol stacks for user traffic and for virtual firewall management signaling. It will also be appreciated that the control node 38-1 and/or SGW 34-1 includes a logical and/or physical interface to its associated data center 24.

Figure 3:
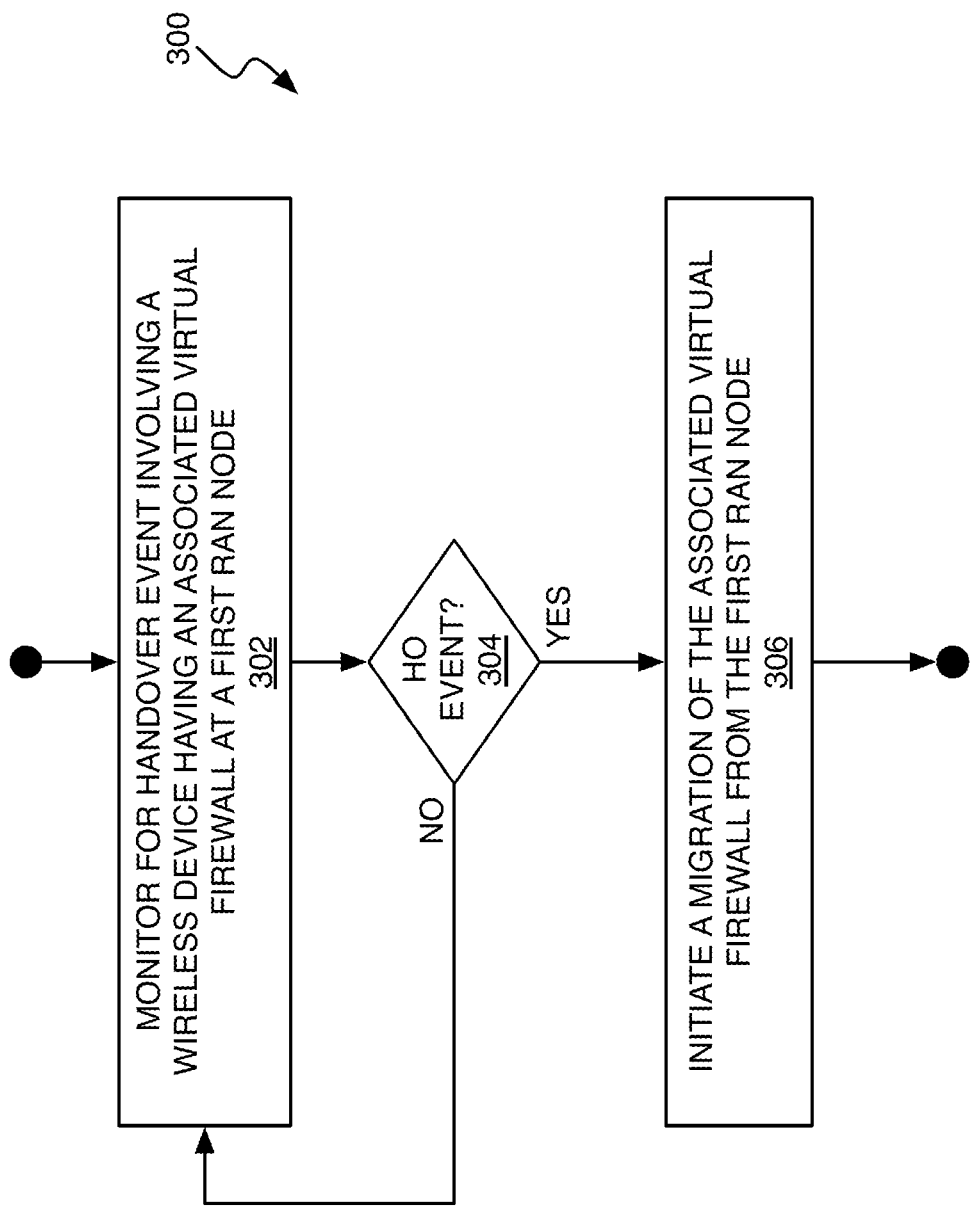
FIG. 3 is a logic flow diagram illustrating one embodiment of a method of virtual firewall management, as taught herein for a CN control node.

FIG. 3 illustrates an overall method of virtual firewall management as performed by the first control node 38-1 in one or more embodiments. The data and program memory 54 shown in FIG. 2 may store a computer program 60 which, when executed by the processing circuit 52, configures the processing circuit 52 to perform the method 300. In such embodiments, the processing circuit 52 comprises one or more microprocessors, DSPs, FPGAs, ASICs, or other digital processing circuitry that are configured or otherwise specially adapted, based on their execution of the computer program 60.

The method 300 includes detecting a handover event involving handover of a device 12 from a first RAN node 20-1 in the network 10 to a second RAN node 20-2 in the network 10, wherein an associated virtual firewall 26 is maintained for the device 12 at the first RAN node 20-1. This detecting step can be understood as monitoring (Blocks 302, 304) for handover events involving devices 12 having associated virtual firewalls at the first RAN node 20-1. Here, it might be noted that not all devices 12 served by the first RAN node 20-1 necessarily have an associated virtual firewall 26, or at least do not necessarily have their associated virtual firewalls 26 maintained at the first RAN node 20.

The method 300 further includes, in response to the detection step—YES from Block 304—initiating (Block 306) a migration of the associated virtual firewall 26 from the first RAN node 20-1. As noted, the migration is a horizontal migration of the associated virtual firewall 26 to the second RAN node 20-2, or a vertical migration of the associated virtual firewall 26 into the CN 18—e.g., to the data center 24 associated with the first SGW 34-1. Also as noted, the determination as to whether horizontal or vertical migration is selected may be based on mobility data for the device 12 involved in the handover event. Additionally, or alternatively, vertical migration may be selected responsive to an indication that there is a lack of available resources at the second RAN node 20-2.

Turning back to FIG. 2, the example first RAN node 20-1 includes a communication interface 70 configured for communicating with a control node 38 in the network 10 and with a wireless device 12 served by the first RAN node 20-1, and a processing circuit 72 that is operatively associated with the communication interface 70 and configured to: maintain an associated virtual firewall 26 for the wireless device 12, and receive transfer initiation signaling from the control node 38, indicating that the associated virtual firewall 26 is to be migrated. The processing circuit 72 is further configured to transfer the associated virtual firewall 26 in accordance with the transfer initiation signaling. The initiated transfer either being a horizontal migration of the associated virtual firewall 26 to the second RAN node 20-2, or being a vertical migration of the associated virtual firewall 26 to the CN 18.

In the context of the above-described RAN node 20-1, the "maintaining" of the associated virtual firewall 26 may comprise the RAN node 20-1 actively tracking packets and updating firewall state information, or may simply comprise the RAN node 20-1 sending signaling to is associated data center 24, indicating that the associated firewall 26 should be activated or otherwise maintained and applied. Such signaling may be generated locally by the first RAN node 20-1, e.g., autonomously, or such signaling may be passed through from the control node 38, or at least initiated by the control node 38 sending signaling to the first RAN node 20-1. For example, it may be that the first RAN node 20-1 earlier received the associated virtual firewall 26 in a prior handover event, or that the control node 38 otherwise earlier transferred the associated virtual firewall 26 to the first RAN node 20-1 as part of call setup connection signaling for the device 12.

The communication interface 70 may comprise a number of communication interfaces, some of which may share certain physical connections, but which may use different protocols. For example, the communication interface 70 includes control node interface 74 for communicating with the control node 38-1. To the extent that the control node 38-1 is integrated within the SGW 34-1, this interface may be shared at least with respect to certain physical connection details, with the SGW interface that is included in the first RAN node 20-1, but is not explicitly shown in FIG. 2. However, as noted, in one or more embodiments, virtual firewall management signaling uses a dedicated protocol that is separate from the signaling protocols used for carrying user traffic between RAN nodes 20 and their respective SGWs 34.

The communication interface 70 may further comprise an MME interface 76 for mobility-related signaling, including, for example, receiving mobility-related information for a given device 12. The communication interface 70 also may include an inter-base-station (inter-BS) interface 78, for communicating with other RAN nodes 20, such as for tunneling user traffic to and from another RAN node 20, migrating virtual firewalls 26, exchanging loading and/or resource availability information, especially with regard to virtual firewall migrations, etc. Still further, the communication interface 70 generally will include a radio interface 80, for providing the air interface that connects wireless devices 12 to the network 10.

Figure 4:
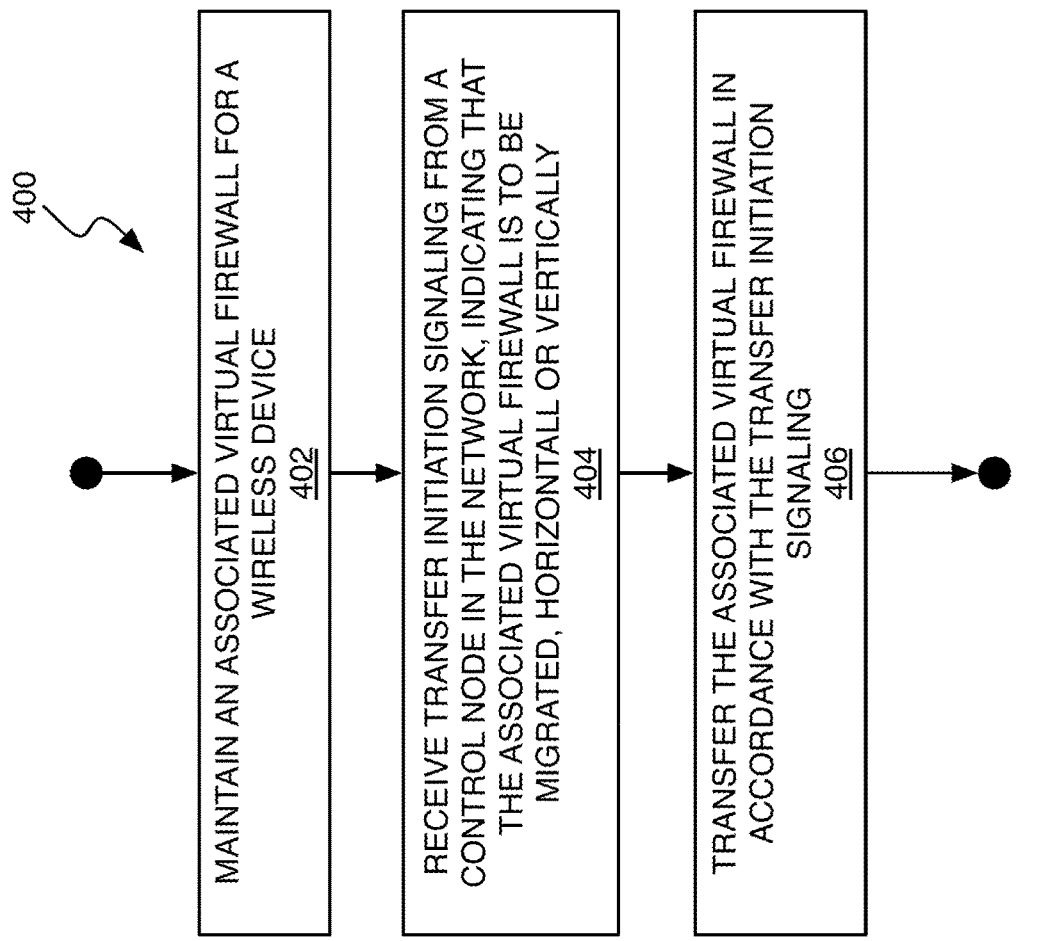
FIG. 4 is a logic flow diagram illustrating one embodiment of a method of virtual firewall management, as taught herein for a RAN node that is, for example, acting a source node in a handover event.

The processing circuit 72 may comprise one or more microprocessors, DSPs, FPGAs, ASICs, and/or other digital processing circuits. In at least one embodiment, the digital processing circuit(s) comprising the processing circuit 72 are configured to perform virtual firewall management as taught herein for RAN nodes 20, based on the execution of computer program instructions stored in data and program memory 82, which is included or associated with the processing circuit 72. In the illustrated example, the processing circuit 72 is configured to perform virtual firewall management based at least in part on its execution of a computer program 84, which comprises computer program instructions that, when executed by the processing circuit 72, configure the processing circuit 72 to carry out the method 400 of FIG. 4, or variations of that method.

The method 400 includes maintaining (Block 402) an associated virtual firewall 26 for a device 12. "Maintained" as used here may mean that processing logic within the processing circuit 72 of the first RAN node 20-1 performs all maintenance—including state updating for stateful firewall implementations—or may mean that the RAN node 20 maintains an awareness of and/or supervisory role with respect to firewall-related operations performed in the associated data center 24. Thus, the "maintaining" step may mean but does not require that the first RAN node 20-1 be operative to keep firewall state information updated responsive to any traffic flows that are active for the associated device 12.

The method 400 further includes receiving (Block 404) transfer initiation signaling from a control node 38 in the network 10, indicating that the associated virtual firewall 26 is to be migrated, and transferring (Block 406) the associated virtual firewall 26 in accordance with the transfer initiation signaling. For example, the signaling may indicate that the migration is horizontal and may identify the second RAN node 20-2 as the target for migration, or the target RAN node 20 may already be known to the first RAN node 20-1 from handover-related mobility information.

In an example configuration, transferring the associated virtual firewall 26 in accordance with the transfer initiation signaling comprises transferring a copy of the associated virtual firewall 26 according to a then-existing state of the associated virtual firewall 26. In the same or in another configuration, the method includes continuing to apply the associated virtual firewall 26 to post-handover traffic involving the device 12 that is tunneled between the second RAN node 20-2 and the CN 18 through the first RAN node 20-1. That is, although the associated virtual firewall 26 is migrated, the first RAN node 20-1 retains a copy of the associated virtual firewall 26 and continues applying it, at least until receiving an indication that the associated virtual firewall 26 is activated for the device 12 at the second RAN node 20-2. In general, the migration or "transfer" of a virtual firewall 26 can include sending an image file of the virtual firewall 26 to the second RAN node 20-2 and instructing the second RAN node 20-2 to instantiate virtual machine(s) to run a copy of the virtual firewall 26.

Figure 5:
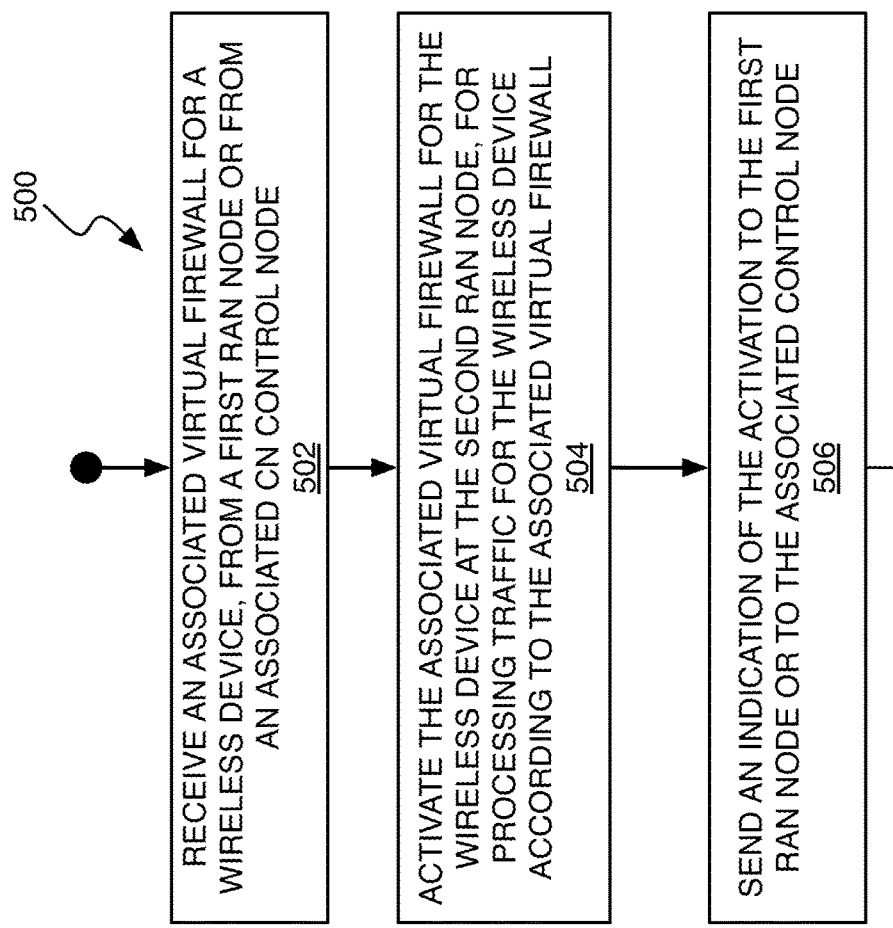
FIG. 5 is a logic flow diagram illustrating one embodiment of a method of virtual firewall management, as taught herein for a RAN node that is, for example, acting a target node in a handover event.

FIG. 5 illustrates a corresponding method 500 at the target RAN node 20, e.g., the second RAN node 20-2 in the foregoing example. A given RAN node 20 may act as the first RAN node 20-1 in a given migration event—i.e., as the "transferor" of a virtual firewall 26—and may act as the second RAN node 20-2 in another migration event—i.e., as the "transferee" or recipient of a virtual firewall 26.

The method 500 includes receiving (Block 502) an associated virtual firewall 26 for a device 12, from a first RAN node 20-1, or from an associated control node 38 in the CN 18, activating (Block 504) the associated virtual firewall 26 at the second RAN node 20-2 for processing traffic for the device 12 according to the associated virtual firewall 26, and sending (Block 506) an indication of the activation to the first RAN node 20-1, or to the associated control node 38. In an example scenario, the associated virtual firewall 26 is received in conjunction with the device 12 being handed over from the first RAN node 20-1 to the second RAN node 20-2. Here, the method 500 in one or more embodiments includes exchanging post-handover traffic between the device 12 and the CN 18 via the first RAN node 20-1, at least until performing the steps in the method 500 of activating and sending.

Post-handover traffic may be routed or otherwise steered through the first RAN node 20-1 using a tunneling mechanism. At this level in the network 10, such steering generally is not IP-based routing, but rather commanded tunneling or inter-node transfers of traffic done under control of the control node 38 or a SGW 34 responding to signaling from a control node 38.

Further, it should be noted that "activating" the associated virtual firewall 26 at the second RAN node 20-2 may comprise the second RAN node 20-2 communicating with its associated data center 24—e.g., providing the associated virtual firewall 26, or parameters representing its particulars, to the data center 24, and indicating that the data center 24 should initialize or otherwise activate the virtual firewall 26 for processing traffic to/from the associated device 12. Along these same lines, the second RAN node 20-2 may forego use of the associated virtual firewall 26 at its location and continue tunneling traffic through the first RAN node 20-1 for firewall processing until it receives an indication from its associate data center 24 that it is ready to begin firewall processing using the local copy of the associated firewall 26, or until it is commanded by a control node 38 or other network entity to stop the tunneling.

Figure 6:
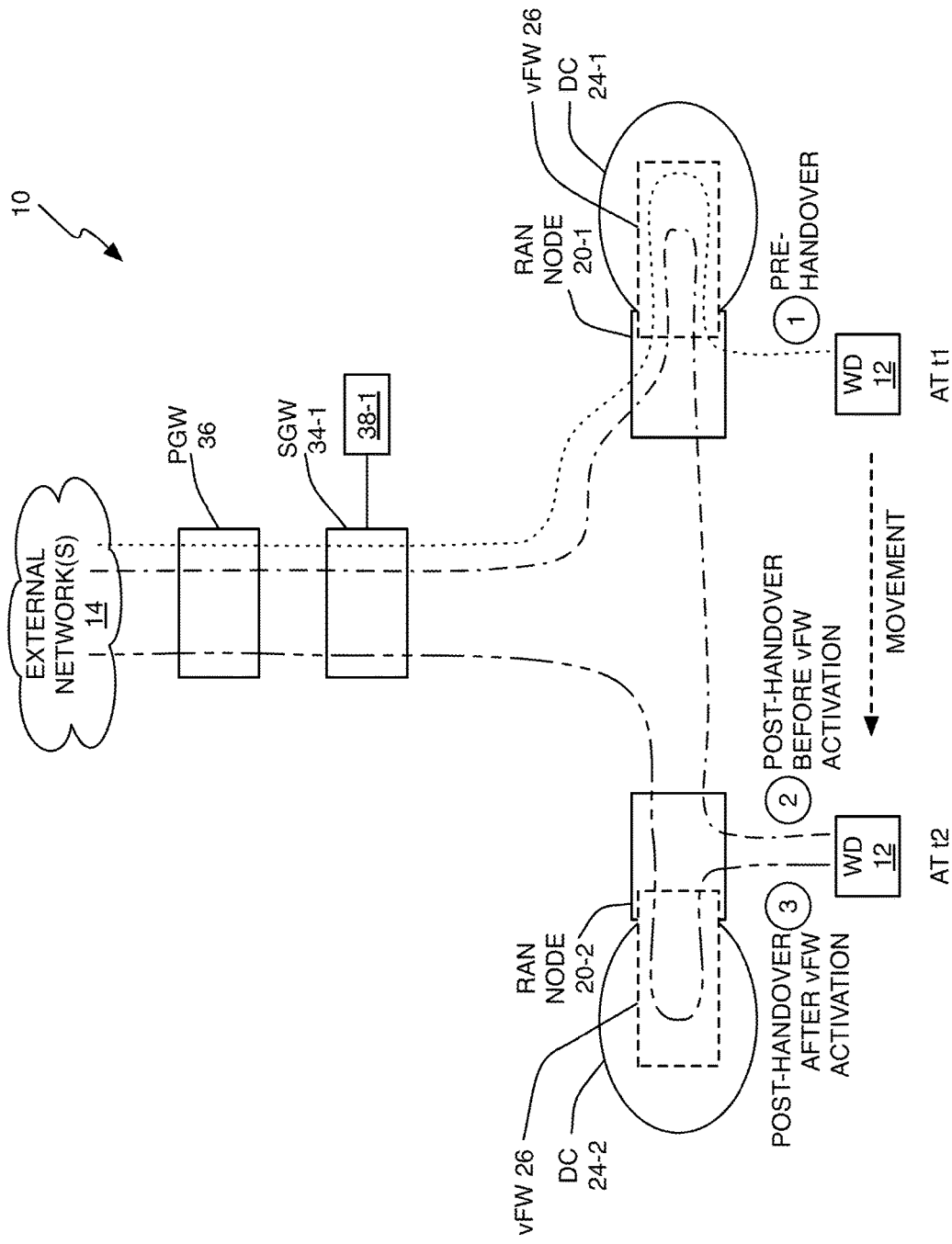
FIGS. 6 and 7A/7B are block diagrams illustrating relevant network nodes and example traffic flows, in the context of virtual firewall migration as taught herein.

FIG. 6 illustrates an example tunneling case, for a scenario where a device 12 is handed over from the RAN node 20-1 to the RAN node 20-2 and the associated virtual firewall 26 is migrated horizontally from the first RAN node 20-1 to the second RAN node 20-2. The track of traffic flow labeled "1" in the diagram represents traffic flow through the network 10, as between the device 12 and an entity in the external network(s) 14 before handover to the RAN node 20-2. The track of traffic flow labeled "2" in the diagram represents traffic flow during handover of the device 12 from the first RAN node 20-1 to the second RAN node 20-3. The track of traffic flow labeled "3" in the diagram represents traffic flow through the network 10, as between the device 12 and an entity in the external network(s) 14, after handover is completed and any tunneling has ended. More particularly, according to the teachings herein, the tunneling of traffic from the second RAN node 20-2 through the first RAN node 20-1 may be continued through handover and until the second RAN node 20-2 indicates or otherwise determines that the associated virtual firewall 26 is activated at the second RAN node 20-2.

Figure 7A:
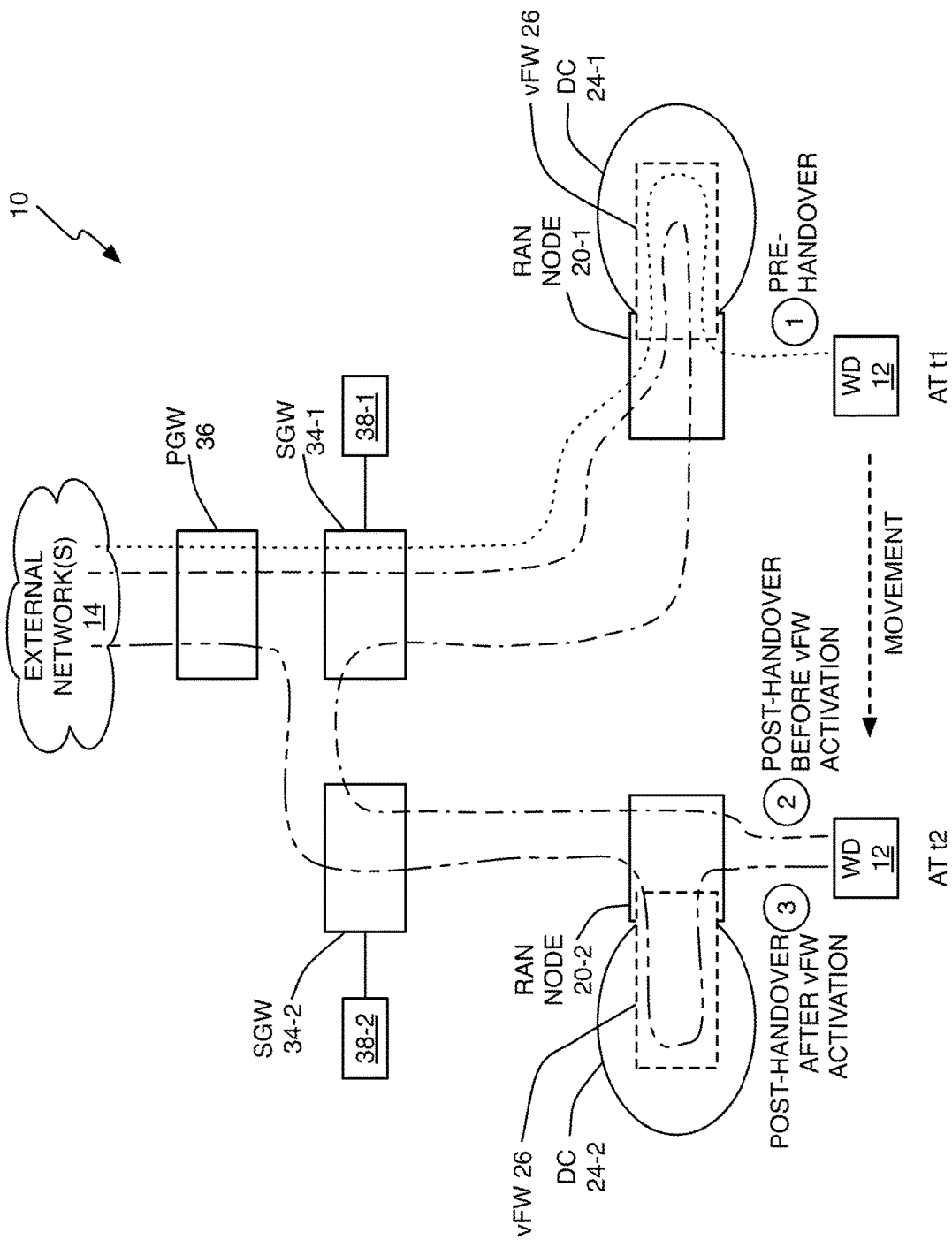
Figure 7B:
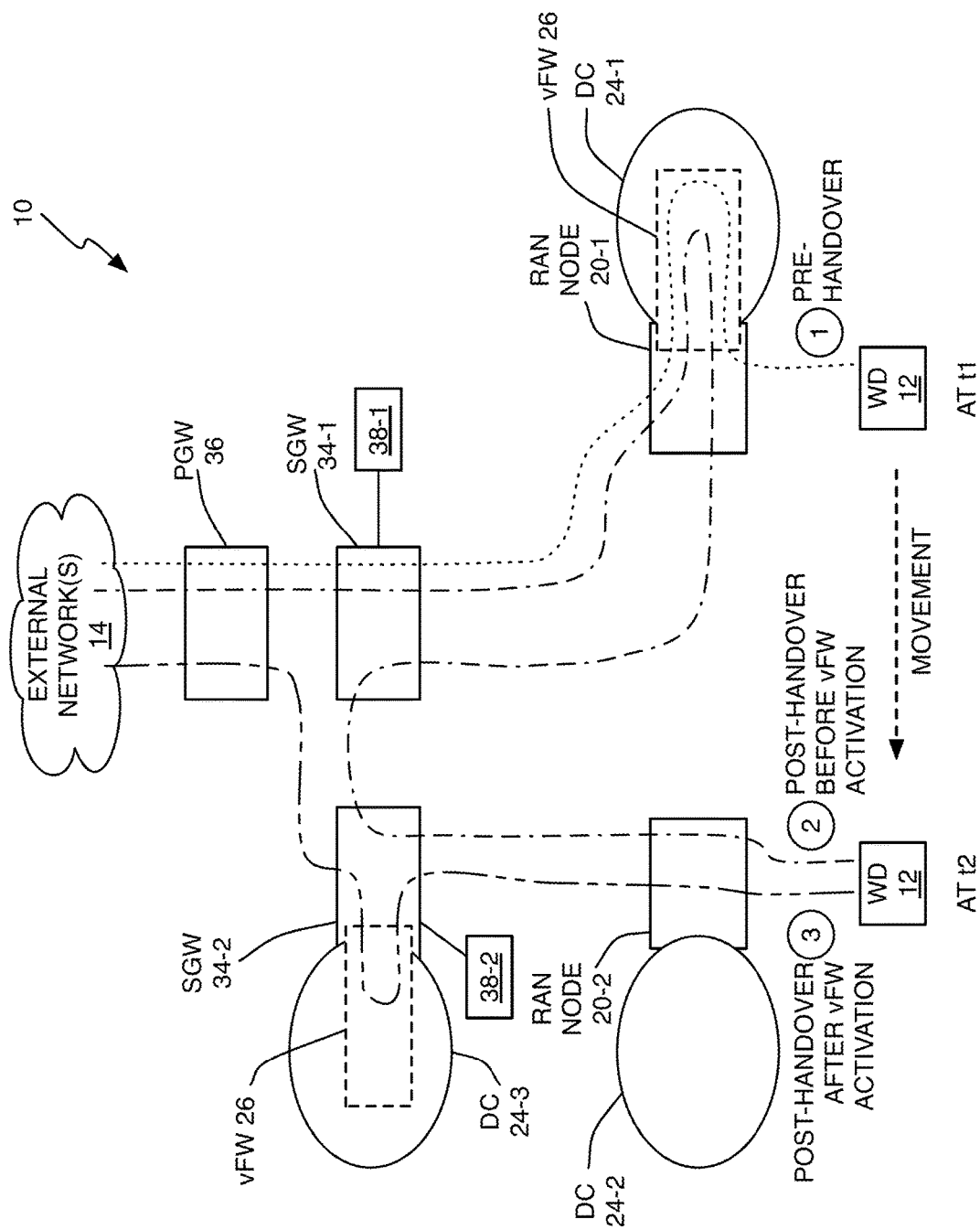

FIG. 7A show a similar handover event involving horizontal migration and associated tunneling. However, in FIG. 7A the first and second RAN nodes 20-1 and 20-2 operate under first and second SGWs 34-1 and 34-2, which in turn operate with respective control nodes 38-1 and 38-2. FIG. 7B differs from FIG. 7A in that the migration is vertical, rather than horizontal. In particular, one sees that the associated virtual firewall 26 is migrated from the first RAN node 20-1 to the SGW 34-2/control node 38-2 that are associated with the second RAN node 20-2.

Generally, for handover of a device 12 between two RAN nodes 20 that operate under the same SGW 34, the responsible control node 38 in the network 10 instructs the source RAN node 20 to migrate the associated virtual firewall 26 to the target RAN node 20, for horizontal migration, or, for vertical migration, to migrate the associated virtual firewall 26 into the CN 18, e.g., to the associated SGW 34, or control node 38, or PGW 36, or other CN entity.

In association with controlling migrations of virtual firewalls 26, the control node 38 may be configured to generate and send control messages that include any one or more of: control messages to initiate the migration; control messages to identify the type of migration; control messages to specify the target for migration; control messages to command, control, or avoid post-handover tunneling while awaiting an indication of virtual firewall activation at the migration target; and control messages to convey, modify, activate or deactivate targeted virtual firewalls 26.

As noted, the control node 38 in some embodiments is configured to decide whether a given migration of a virtual firewall 26 should be horizontal or vertical based on the mobility of the associated device 12—e.g., based on the speed of the device 12. More generally, the control node 38 in one or more embodiments decides between horizontal and vertical migration based on any one or more of: mobility of the device 12; resource usage at the RAN node that would be targeted in the horizontal migration (e.g., in terms of available resources or computational cost); and resource usage at the CN node that would be targeted in the vertical migration (e.g., in terms of available resources or computational cost). Further, in addition its configuration regarding the transmission of control signaling, the control node 38 also may be configured to receive related signaling, handshaking, etc. from any of the other nodes involved in a given migration event.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of virtual firewall management performed at a first control node in a wireless communication network that includes a Core Network, CN, and an associated Radio Access Network, RAN, said method comprising:
   detecting a handover event involving handover of a wireless device from a first RAN node in the network to a second RAN node in the network, wherein an associated virtual firewall is maintained for the wireless device at the first RAN node; and
responsive to said detecting, initiating a migration of the associated virtual firewall from the first RAN node, said migration being a horizontal migration of the associated virtual firewall to the second RAN node, or being a vertical migration of the associated virtual firewall into the CN;
said method further comprising selecting between horizontal migration or vertical migration of the associated virtual firewall based on evaluating at least one of mobility data for the wireless device and location data for the wireless device.

2. The method of claim 1, wherein the method includes at least one of:
selecting vertical migration of the associated virtual firewall, if the mobility data indicates a rate or frequency of handover for the wireless device that is above a defined threshold, or indicates a speed of the wireless device that is above a defined threshold; and
selecting vertical migration of the associated virtual firewall, if the location data corresponds to a service area where the network is configured to select vertical migration.

3. The method of claim 1, further comprising, if vertical migration of the associated virtual firewall was selected, later determining whether to migrate the associated virtual firewall back into the RAN, based on evaluating at least one of subsequent mobility data for the wireless device and subsequent location data for the wireless device.

4. The method of claim 1, wherein said selecting between horizontal migration or vertical migration of the associated virtual firewall is further based on evaluating an indication of resource availability at the second RAN node.

5. The method of claim 1, wherein the first control node is a first Serving Gateway, SGW, in the CN, and is configured for transferring traffic to and from wireless devices supported at least by the first RAN node.

6. The method of claim 5, wherein, if the first and second RAN nodes are both associated with the first SGW and horizontal migration of the associated firewall was selected, the method includes initiating horizontal migration for the associated virtual firewall by sending control signaling towards the first RAN node, indicating that the associated virtual firewall is to be transferred to the second RAN node.

7. The method of claim 6, further comprising, until detecting that the associated virtual firewall has been activated for the wireless device at the second RAN node, temporarily tunneling post-handover traffic involving the wireless device through the first RAN node, for processing of the post-handover traffic via a copy of the associated virtual firewall, as retained at the first RAN node.

8. The method of claim 1, wherein, if the first RAN node is associated with the first SGW and the second RAN node is associated with a second SGW as a second control node in the network and horizontal migration of the associated virtual firewall was selected, the method includes initiating horizontal migration of the associated virtual firewall by sending control signaling towards the first RAN node, indicating that the associated virtual firewall is to be transferred to the first SGW, and then transferring the associated virtual firewall from the first SGW to the second SGW.

9. The method of claim 8, further comprising, until detecting that the associated virtual firewall has been activated for the wireless device at the second RAN node, temporarily tunneling post-handover traffic involving the wireless device through the first SGW and the first RAN node, for processing of the post-handover traffic via a copy of the associated virtual firewall as retained at the first SGW or at the first RAN node.

10. The method of claim 1, wherein said selecting between horizontal migration or vertical migration of the associated virtual firewall is further based on one or more of: resource usage at the RAN node that would be targeted in the horizontal migration; and resource usage at the CN node that would be targeted in the vertical migration.

11. A first control node configured for virtual firewall management in a wireless communication network that includes a Core Network, CN, and an associated Radio Access Network, RAN, said first control node comprising:
a communication interface configured for communicating with a first RAN node in the network;
a processing circuit that is operatively associated with the communication interface and configured to:
detect a handover event involving handover of a wireless device from the first RAN node in the network to a second RAN node in the network, wherein an associated virtual firewall is maintained for the wireless device at the first RAN node;
responsive to said detecting:
initiate a migration of the associated virtual firewall from the first RAN node, said migration being a horizontal migration of the associated virtual firewall to the second RAN node, or being a vertical migration of the associated virtual firewall into the CN; and
select between horizontal migration or vertical migration of the associated virtual firewall based on evaluating at least one of mobility data for the wireless device and location data for the wireless device.

12. The first control node of claim 11, wherein the processing circuit is configured to perform at least one of the following operations:
select vertical migration of the associated virtual firewall, if the mobility data indicates a rate or frequency of handover for the wireless device that is above a defined threshold, or indicates a speed of the wireless device that is above a defined threshold; and
select vertical migration of the associated virtual firewall, if the location data corresponds to a service area where the network is configured to select vertical migration.

13. The first control node of claim 11, wherein, if vertical migration of the associated virtual firewall was selected, the processing circuit is configured to later determine whether to migrate the associated virtual firewall back into the RAN, based on evaluating at least one of subsequent mobility data for the wireless device and subsequent location data for the wireless device.

14. The first control node of claim 11, wherein the first control node is a first Serving Gateway, SGW, in the CN, and is configured for transferring traffic to and from wireless devices supported at least by the first RAN node.

15. The first control node of claim 14, wherein, if the first and second RAN nodes are both associated with the first SGW and horizontal migration of the associated virtual firewall was selected, the processing circuit is configured to initiate horizontal migration of the associated virtual firewall by sending control signaling towards the first RAN node, indicating that the associated virtual firewall is to be transferred to the second RAN node.

16. The first control node of claim 14, wherein the processing circuit is configured to temporarily tunnel post-handover traffic involving the wireless device through the first SGW and the first RAN node, for processing of the post-handover traffic via a copy of the associated virtual firewall as retained at the first SGW or at the first RAN node, until detecting that the associated virtual firewall has been activated for the wireless device at the second RAN node.

17. The first control node of claim 11, wherein, if horizontal migration of the associated virtual firewall was selected and if the first RAN node is associated with the first SGW and the second RAN node is associated with a second SGW as a second control node in the network, the processing circuit is configured to initiate the horizontal migration by sending control signaling towards the first RAN node, indicating that the associated virtual firewall is to be transferred to the first SGW, and to then transfer the associated virtual firewall from the first SGW to the second SGW.

18. The first control node of claim 17, wherein the processing circuit is configured to temporarily tunnel post-handover traffic involving the wireless device through the first SGW and the first RAN node, for processing of the post-handover traffic via a copy of the associated virtual firewall as retained at the first SGW or at the first RAN node, until detecting that the associated virtual firewall has been activated for the wireless device at the second RAN node.

\* \* \* \* \*